United States Patent [19]

Wojcik

[11] 4,436,776
[45] Mar. 13, 1984

[54] PROCESS FOR CUSTOMIZING GLASS GREETING CARDS AND GLASS GREETING CARD PRODUCT

[76] Inventor: William Wojcik, 3909 Northaven Dr., Charlotte, N.C. 28206

[21] Appl. No.: 491,356

[22] Filed: May 4, 1983

[51] Int. Cl.³ .......................... A47G 1/12; B44C 1/22; C03C 15/00; C03C 25/06
[52] U.S. Cl. ...................................... 428/14; 156/654; 156/659.1; 156/663; 428/7
[58] Field of Search ............... 229/92.8; 283/1; 46/35; 156/633, 654, 659.1, 663, 63; 65/31; 428/7, 9, 12, 13, 14

[56] References Cited

U.S. PATENT DOCUMENTS

| | | | |
|---|---|---|---|
| 3,183,140 | 5/1965 | Gibson | 156/659.1 X |
| 3,769,113 | 10/1973 | Gruenke | 156/663 X |
| 4,323,423 | 4/1982 | Schrunk | 156/663 X |

Primary Examiner—William A. Powell
Attorney, Agent, or Firm—W. Thad Adams, III

[57] ABSTRACT

A process and the resulting article for fabricating a customized glass greeting card wherein two sheets of glass with a design etched there on are each placed in a frame and hinged together on one side thereof to resemble a folded card. Unetched areas of the glass appear relatively dark compared with translucent areas whether the frames are open or closed together.

6 Claims, 2 Drawing Figures

PROCESS FOR CUSTOMIZING GLASS GREETING CARDS AND GLASS GREETING CARD PRODUCT

TECHNICAL FIELD AND BACKGROUND OF THE INVENTION

This invention relates to a process for producing customized glass greeting cards and the glass greeting card product resulting from such process. The process is relatively simple and produces attractive and permanent keepsakes or mementos. Because of the flexibility of the process, graduation and wedding announcements, greeting cards, poetry and items written in handwriting can be converted from an image on paper to an image on glass.

The particular disclosure of this application is of a glass greeting card which contains a design on the top sheet of glass and a design and inscription on the bottom sheet of glass. However, there are a number of possible variations which all fall within the basic teaching of this application.

It is quite common and customary to give and receive greeting cards, wedding, birth and graduation announcements and other objects which may have continuing significance as a memento of a particular event. However, even high quality paper has a tendency to yellow and become brittle with age in addition to the usual hazards of inadvertent tearing or folding. The process and product disclosed in this application permit such a memento to be exactly duplicated on a sheet of glass in order to provide a more permanent and lasting memento. When produced in accordance with the process described in this application, the glass greeting card exhibits an unexpected phenomonen, the tendency of clear glass to appear substantially darker than adjacent translucent glass because of the light being transmitted through the clear sections but reflected back to the observer from the translucent sections. An unusual and attractive phenomonen results when two sheets of the glass with designs etched thereon are placed in close, spaced-apart relation to each other. The design on the bottom sheet of glass tends not to show through the top sheet with the result that the tope sheet can be observed without substantial visual interference from the sheet below it.

SUMMARY OF THE INVENTION

Therefore, it is an object of the invention to provide a process for customizing glass greeting cards wherein an etching chemical is used to etch areas of the glass surrounding a pre-determined design.

It is another object of the present invention to provide a process of etching a design into glass whereby the clear etched glass transmits light and appears dark relative to the translucent areas of glass which reflect light and therefore appear relatively light. The glass therefore resembles a printed card which would normally have dark lettering appearing on a white background paper.

It is another object of the present invention to provide a process of customizing a glass greeting card whereby two sheets of glass with a design etched thereon are each placed in a frame with the frames hinged together on one side thereof to resemble a folded card. The unetched areas appear relatively dark compared with the translucent areas whether the hinged frames are open or closed together.

It is yet another object of the present invention to provide a customized glass greeting card manufactured according to a process described below.

These and other objects and advantages of the present invention are achieved in the preferred embodiment of the process and product described below by providing first and second sheets of glass onto which a design is to be etched.

A design is applied to the first and second sheets of clear glass by covering the glass with an impermeable substance where the design is to appear. The first and second sheets of glass are then etched where not covered by means of an etching chemical to impart a translucent finish to the exposed glass. The etching chemical is removed after the etching process is complete, and the design is removed to expose clear, unetched glass. Each sheet of glass is then placed in a frame with the frame hinged together on one side thereof to resemble a folded card. The clear unetched glass transmits light and appears relatively dark compared to the translucent areas of the glass which reflect light and appear relatively lighter. The framed glass resembles a printed card whether the hinged frames are open or closed together. Only the design on the top sheet of glass is visible when the hinged frames are closed together.

According to one embodiment of the process, an adhesive sheet is applied to the glass and then parts of the sheet are removed to leave other parts defining the design adhering to the glass. In another embodiment of the process according to the present invention, the design is applied to the sheets of glass by placing a mesh screen, such as a silkscreen, in intimate contact with the glass. The screen has impermeable and permeable areas thereon corresponding to the desired design. The etching chemical is squeezed through the screen only in the permeable areas therefore creating a design on the sheet of glass.

According to another embodiment of the present invention, the step of etching the exposed glass includes the steps of first producing a transparency having an opaque design thereon. A screen is then produced wherein the design comprises the permeable areas of the screen. An etching chemical-resistant paint is applied through the permeable areas of the screen onto the glass. The screen is then removed from the glass and the etching chemical is applied to the entire sheet of glass. When the etching chemical and resistant paint are removed, a clear design appears on a translucent, etched background. The product according to the present invention comprises first and second sheets of glass having a design formed by areas of transparent and etched, translucent surfaces. First and second frames are hinged together on one side for holding the first and second sheets of glass, respectively, so as to resemble a folded card.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
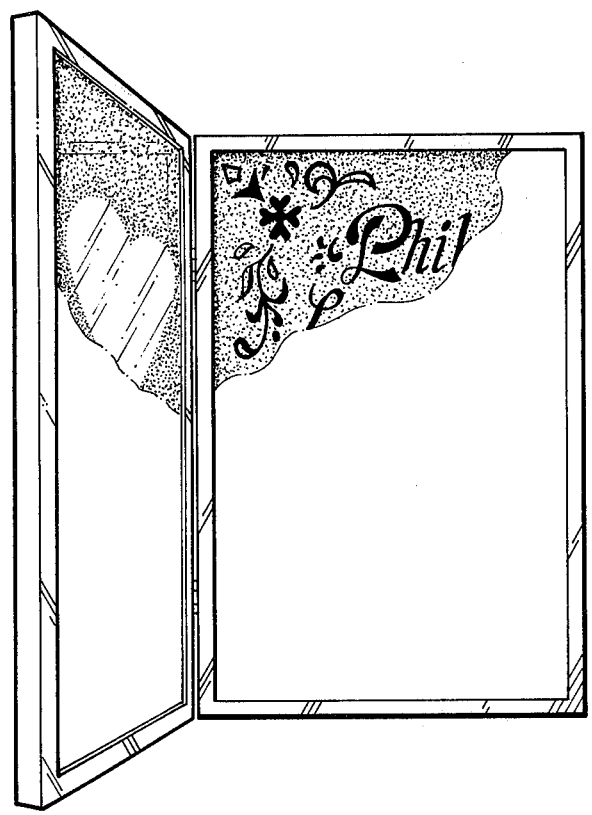
FIG. 1 is a folded greeting card according to the present invention and produced according to the process of the present invention while in its open position; and, FIG. 2 is a glass greeting card as described in FIG. 1, in its closed position with the top sheet of glass in close, spaced-apart relation to the bottom sheet.

Referring now specifically to the drawings, a preferred embodiment of the customized glass greeting card according to the present invention is shown in FIG. 1 and indicated generally at broad reference numeral 10. Card 10 is comprised of sheets of glass 12 and 13 held in their respective locations by frames 15 and 16. Frames 15 and 16 are held together by hinges 18 and 19 affixed to one edge of each frame so that the sheets 12 and 13 can be moved in a plane relative to each other in the same manner as a folded greeting card would be folded or unfolded.

A design is etched on sheets 12 and 13 as will be described in detail below. In the drawings, the etched area of sheet 12 is designated as 12a and the transparent, unetched areas as 12b. Similarly, the etched areas of sheet 13 are designated as 13a and the transparent, unetched areas as 13b.

According to one process, an adhesive coated paper, sometimes referred to as "contact" paper is applied to the glass so that it sticks. A design is cut into the contact paper and certain cut-out areas of the paper removed to expose areas of the glass surface. According to this invention, the areas which remain covered by the contact paper comprise the design itself with the background comprising the exposed glass surface. In addition, transfer letters can be stuck to the glass to form text. An acid cream of conventional composition is applied to the glass. After an appropriate period of time, the acid cream, remaining contact paper and transfer letters, if any, are removed from the glass and the glass is cleaned. This same process is carried out for sheets 12 and 13 as shown in FIG. 1.

Another process may be used to form a sheet of glass having the same appearance as that described above. This is done by "silkscreening" the pattern onto the glass. A frame having a tightly stretched, densely woven material such as silk thereon is used. The process begins by painting the one side of the silkscreen with a coating of a plastic emulsion material. When the emulsion dries it is light sensitive. Any desired design is placed flush on the screen. If, for example, a wedding announcement is to be duplicated on the glass, a transparency is first made of the announcement. The transparency is a "negative" meaning that the black letters on the paper card appear as clear letters on the transparency while the paper background is black. The light sensitive emulsion is exposed to a "black light" and the screen is developed. After the proper length of exposure the screen is washed. The emulsion that was not exposed to the "black light" comes off and forms the area through which the acid etching chemical will be applied. This screen is laid on top of the sheet of glass and carefully aligned. Then an etching chemical such as the acid cream described above is applied to the screen and squeegeed across the screen through the screen onto the glass. After the appropriate amount of time, the acid cream is washed off the glass to expose the etched, translucent surface. The areas covered by the emulsion and protected from the etching chemical remain transparent.

A similar technique is particularly useful for reproducing signatures and the like. A positive transparency is first made of the signature on which the signature appears dark and the background clear. The transparency is placed on the screen over the light sensitive emulsion and exposed as described above. Since the signature itself is the only part not exposed it is the only part of the emulsion removed. Then the screen is placed over the glass and acid resistant paint goes through the screen onto the glass. Then the entire sheet of glass is covered with the etching chemical. The etching chemical and paint are removed at the same time leaving the unetched signature surrounded by a background of translucent, etched glass. In the process described immediately above, transfer letters can also be placed directly on the glass prior to applying the etching chemical. A step is saved in that a transparency does not need to be made of the arrangement of the letters. The etching chemical softens the transfer letters so they come off at the same time as the acid resistant paint over the signature, and the etching chemical itself.

Referring again to FIG. 1, the two sheets of glass 12 and 13, each with a different pattern etched thereon, can be seen separately when the frames 15 and 16 are pivoted away from each other. Viewed from the other side, the transparent area 12b of sheet 12 would appear dark, just as does the area 13b of sheet 13.

Figure 2:
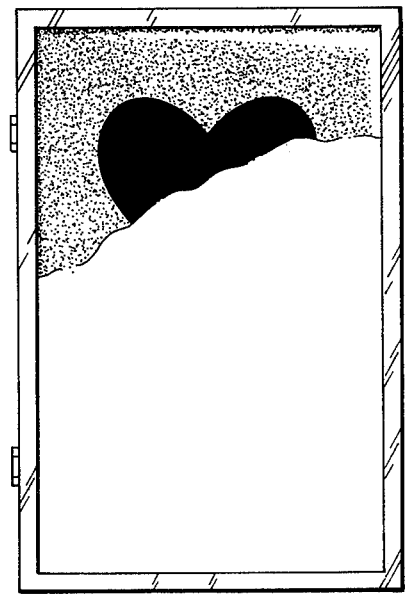

In FIG. 2, sheets 12 and 13 are shown with the frames 15 and 16 in their fully closed position. The translucent area 12a reflects light back to the observer so that sheet 13 is not visible. The light transmitted through the transparent area 12b does not, for the most part, reflect back so this area appears relatively dark. Therefore, the design on sheet 13 does not interfere with the design on the sheet 12 when they are positioned closely together.

According to a preferred embodiment of the invention, the frame is formed of brass square channel 5/32 inch in width for a sheet of glass ⅛ inch thick. The brass is cut into appropriate size and the edges mitered. The corners are soldered as are the hinges 18 and 19 which join frames 15 and 16 together.

A process for customizing a glass greeting card and a glass greeting card produced according to the process is described above. Various details of the invention may be changed without departing from its scope. Furthermore, the foregoing description of a preferred embodiment of the process and product according to the present invention is provided for the purpose of illustration only and not for the purpose of limitation—the invention being defined by the claims.

I claim:

1. A process for customizing glass greeting cards, comprising the steps of:
   (a) applying a design to first and second sheets of clear glass by covering the glass with an impermeable substance where the design is to appear;
   (b) etching the glass of the first and second sheets where not covered by means of an etching chemical to impart a translucent finish thereto, whereupon the etching chemical is removed;
   (c) removing the design to expose clear, unetched glass;
   (d) placing each sheet of glass in a frame and hinging the frames together on one side thereof to resemble a folded card whereby the clear unetched glass transmits light and appears dark relative to the translucent areas of glass which reflect light and appear relatively light and so resembles a printed card whether the hinged frames are open or closed together and further whereby only the design on the top sheet of glass is visible when the hinged frames are closed together.

2. A process according to claim 1 wherein the step of applying the design to the sheets of glass comprises applying an adhesive sheet to the glass and then removing parts of the sheet to leave other parts defining the design adhering to the glass.

3. A process according to claim 1 wherein the step of applying the design to the sheets of glass comprises the step of placing a mesh screen in intimate contact with the glass, the screen having permeable and impermeable areas thereon corresponding to the desired design.

4. A process according to claim 3 wherein the step of etching the exposed glass comprises the further steps of:
   (a) applying an etching chemical to the screen and squeezing the chemical through the permeable areas of the mesh onto the glass; and,
   (b) removing the etching chemical from the glass after a pre-determined period of time to expose the etched glass.

5. A process according to claim 3 wherein the step of etching the exposed glass comprises the further steps of:
   (a) producing a transparency having an opaque design thereon;
   (b) producing a screen wherein the design comprises the permeable areas of the screen;
   (c) applying an etching chemical-resistant paint through the permeable areas of the screen onto the glass and then removing the screen from the glass;
   (d) applying the etching chemical to the entire sheet of glass; and,
   (e) removing the etching chemical and resistant paint to expose a clear design on a translucent background.

6. A customized glass greeting card comprising:
   (a) first and second sheets of glass having a design thereon formed by areas of transparent and etched, translucent surfaces;
   (b) first and second frames hinged together on one side thereof for holding said first and second sheets of glass, respectively, so as to resemble a folded card;

whereby the clear, etched glass transmits light and appears dark relative to the translucent areas of the glass which reflect light and appear relatively light and so resemble a printed card whether the hinged frames are open or closed together and further whereby only the design on the top sheet of glass is visible when the hinged frames are closed together.

* * * * *